US012497391B2

(12) United States Patent
Fernandes et al.

(10) Patent No.: US 12,497,391 B2
(45) Date of Patent: Dec. 16, 2025

(54) FURANIC DIGLYCIDYL ETHERS AND ESTERS AND USE THEREOF

(71) Applicant: Braskem S.A., Camacari (BR)

(72) Inventors: Felipe Cicaroni Fernandes, Campinas (BR); Iuri Estrada Gouvêa, Campinas (BR); Nei Sebastião Domingues Júnior, Novo Hamburgo (BR)

(73) Assignee: BRASKEM S.A., Camacari (BR)

( * ) Notice: Subject to any disclaimer, the term of this patent is extended or adjusted under 35 U.S.C. 154(b) by 582 days.

(21) Appl. No.: 17/838,061

(22) Filed: Jun. 10, 2022

(65) Prior Publication Data

US 2023/0002363 A1    Jan. 5, 2023

Related U.S. Application Data

(60) Provisional application No. 63/211,380, filed on Jun. 16, 2021.

(51) Int. Cl.
*C07D 407/14* (2006.01)
*C07D 307/68* (2006.01)
*C08G 59/06* (2006.01)

(52) U.S. Cl.
CPC ......... *C07D 407/14* (2013.01); *C07D 307/68* (2013.01); *C08G 59/066* (2013.01)

(58) Field of Classification Search
CPC ............................ C07D 307/68; C07D 407/14
See application file for complete search history.

(56) References Cited

U.S. PATENT DOCUMENTS

| 8,455,668 | B2 | 6/2013 | Fu et al. | |
| 9,284,290 | B2 | 3/2016 | Van Haveren et al. | |
| 2012/0220742 | A1* | 8/2012 | Cho | C08G 59/26 |
| | | | | 526/270 |
| 2015/0291733 | A1 | 10/2015 | Hess et al. | |
| 2018/0355100 | A1 | 12/2018 | Poulat et al. | |
| 2020/0277639 | A1 | 9/2020 | Alexandrino et al. | |
| 2021/0222217 | A1 | 7/2021 | Alexandrino et al. | |

FOREIGN PATENT DOCUMENTS

| CN | 102952253 A | 3/2013 |
| CN | 107001582 A | 8/2017 |
| CN | 110256656 B | 6/2020 |
| WO | 2018089600 A1 | 5/2018 |
| WO | 2021007171 A1 | 1/2021 |

OTHER PUBLICATIONS

Premlata K. Ambre et al., Molecular Modeling Studies, Synthesis and Biological Evaluation of Novel Plasmodium falciparum Lactate Dehydrogenase (pfLDH) Inhibitors, Anti-Infective Agents, 2011, vol. 10, No. 1 (19 pages).

I. W. Ashworth et al., Highlights from the Literature, Organic Process Research & Development (2003), vol. 7, No. 3 (11 pages).
Elyse A. Baroncini et al., Recent advances in bio-based epoxy resins and bio-based epoxy curing agents, Journal of Applied Polymer Science, Jul. 13, 2016 (19 pages). DOI: 10.1002/APP.44103.
Ursula Biermann et al., Oils and Fats as Renewable Raw Materials in Chemistry, Angewandte Chemie International Edition, 2011, vol. 50, pp. 3854-3871 (18 pages). DOI: 10.1002/anie.201002767.
Jin Ku Cho et al., Synthesis of carbohydrate biomass based furanic compounds bearing epoxide end group(s) and evaluation of their feasibility as adhesives, Journal of Adhesion Science and Technology, 2013, vol. 27, Nos. 18-19, pp. 2127-2138 (14 pages).
Min-Shu Cui et al., Production of 4-Hydroxymethylfurfural from Derivatives of Biomass-Derived Glycerol for Chemicals and Polymers, ACS Sustainable Chemistry & Engineering, 2016, vol. 4, pp. 1707-1714 (8 pages).
Shanmugam Thiyagarajan et al., Biobased furandicarboxylic acids (FDCAs): effects of isomeric substitution on polyester synthesis and properties, Green Chemistry, 2014, vol. 16, pp. 1957-1966 (10 pages).
Fengshuo Hu et al., Correction to Synthesis and Characterization of Thermosetting Furan-Based Epoxy Systems, Macromolecules, 2016, vol. 49, p. 2408 (1 page).
Angela Marotta et al., Green approaches in the synthesis of furan-based diepoxy monomers, The Royal Society of Chemistry Advances, 2018, vol. 8, pp. 16330-16335 (6 pages). DOI: 10.1039/c8ra02739k.
Jia-Tao Miao et al., Biobased Heat Resistant Epoxy Resin with Extremely High Biomass Content from 2,5-Furandicarboxylic Acid and Eugenol, ACS Sustainable Chemistry & Engineering, 2017, vol. 5, pp. 7003-7011 (9 pages). DOI: 10.1021/acssuschemeng.7b01222.
Feifei Ng et al, Bio-Based Aromatic Epoxy Monomers for Thermoset Materials, Molecules, 2017, vol. 22, No. 149, pp. 1-48 (48 pages). DOI:10.3390/molecules22010149.
George Z. Papageorgiou et al., Production of bio-based 2,5-furan dicarboxylate polyesters: Recent progress and critical aspects in their synthesis and thermal properties, European Polymer Journal, 2016, vol. 83, pp. 202-229 (28 pages).
Hee-Woong Park et al., Renewable epoxy thermosets with extremely high biomass content from furan derivatives and their flame retardancy, Journal of Industrial and Engineering Chemistry, 2020, vol. 92, pp. 184-190 (7 pages).
Muhammad Sajid et al., Production of 2,5-furandicarboxylic acid (FDCA) from 5-hydroxymethylfurfural (HMF): recent progress focusing on the chemical-catalytic routes, Green Chemistry, 2018, vol. 20, pp. 5427-5453 (28 pages).

(Continued)

*Primary Examiner* — Amanda L. Aguirre
(74) *Attorney, Agent, or Firm* — Morgan, Lewis & Bockius LLP

(57) ABSTRACT

The present disclosure provides diglycidyl ethers and esters of 2,4-furandimethanol (2,4-FDME) and of 2,4-furandicarboxylic acid (2,4-FDCA), methods of making diglycidyl ethers and esters of 2,4-FDME and 2,4-FDCA, epoxy resins derived from diglycidyl ethers and esters of 2,4-FDME and 2,4-FDCA, and methods of making epoxy resins derived from diglycidyl ethers and esters of 2,4-FDME and 2,4-FDCA.

12 Claims, No Drawings

(56) References Cited

OTHER PUBLICATIONS

Shanmugam Thiyagarajan et al., Synthesis and Thermal Properties of Bio-Based Copolyesters from the Mixtures of 2,5- and 2,4-Furandicarboxylic Acid with Different Diols, ACS Sustainable Chemistry & Engineering, 2019, vol. 7, pp. 18505-18516 (12 pages). DOI: 10.1021/acssuschemeng.9b04463.

Fengshuo Hu et al., Correction to Synthesis and Characterization of Thermosetting Furan-Based Epoxy Systems, Macromolecules, 2014, vol. 47, No. 10, pp. 3332-3342 (34 pages).

\* cited by examiner

FURANIC DIGLYCIDYL ETHERS AND ESTERS AND USE THEREOF

CROSS-REFERENCE TO RELATED APPLICATIONS

This application claims the benefit of and priority to U.S. Provisional Patent Application No. 63/211,380, filed Jun. 16, 2021, which is incorporated herein by reference in its entirety.

BACKGROUND

Epoxy resins, also known as polyepoxides, represent one of the main commercial classes of resins used for the production of thermoset polymers. The conversion of the epoxy resin into a thermoset polymer is carried out by means of a step known as a curing or hardening reaction, responsible for the transformation of low molecular weight monomers into a three-dimensional macromolecular network. This transformation is promoted by the use of crosslinking agents, also known as hardeners or curing agents, which form an extended and typically irreversible network. Cross-linked epoxy resins typically demonstrate very high mechanical properties, excellent chemical resistance and dielectric properties, and as a result are useful in applications such as high performance coatings, engineering and aerospace.

While epoxy resins based on the diglycidyl ether of bisphenol A (BPA), also known as DGEBA or BADGE, are frequently used, BPA has been recognized as an endocrine disruptor and reprotoxic substance. The ability of BPA to leach from these resins under certain temperature and pH conditions has led to significant safety concerns and efforts to develop alternative BPA-free epoxy resins.

Furan derivatives, more specifically furandicarboxylic acids (FDCA) and furandimethanols (FDME) can be produced from bio-based sources, such as different sugar sources, and even by fermentative routes. FDCA can be found in different isomeric forms: the 2,3, 2,4- and 2,5- isomers, although only the latter has been proposed as a starting point for a BPA-free epoxy resin. Studies exploring the singularities of 2,3- and 2,4-FDCA isomers are scarce due to the absence of competitive production routes to obtain these chemicals, although. Thiyagarajan et al. (ACS Sustainable Chem. Eng. 2019, 7, 22, 18505-18516) describes the synthesis and properties of polyesters obtained by combining 2,4- and 2,5-furandicarboxylic acids with ethylene glycol, 1,3-propandiol, or 1,4-butanediol.

Production of 2,4-FDCA from renewable sources using a direct fermentation process as described in U.S. Patent Application Publication No. 2020/0277639 can change this scenario and provide the 2,4-FDCA isomer with low environmental impact and higher cost competitiveness.

There is therefore a need for improved epoxy resins, preferably having increased bio-based content, that can be used to provide thermoset polymers with chemical, thermal and mechanical properties suitable to replace DGEBA resins in applications including coatings, composites, engineering applications, adhesives, construction and electronics.

SUMMARY

The present disclosure provides a diglycidyl ether or ester having a composition according to Formula 1:

Formula 1

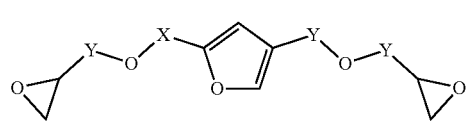

wherein X is selected from the group consisting of $CH_2$ and CO, wherein when X is $CH_2$, Y is selected from the group consisting of $CH_2$ and CO, and wherein when X is CO, Y is $CH_2$.

In an embodiment, the diglycidyl ester has a composition according to Formula 2:

Formula 2

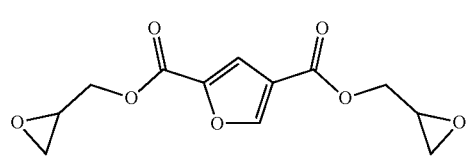

In an embodiment, the diglycidyl ether has a composition according to Formula 3:

Formula 3

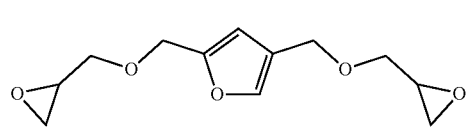

In an embodiment, the diglycidyl ester has a composition according to Formula 4:

Formula 4

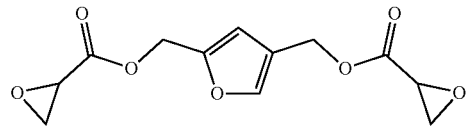

The present disclosure also provides a method of making a diglycidyl ester, the method comprising: reacting 2,4-FDCA with an allyl halide to form an ester having a composition according to Formula 2a:

Formula 2a

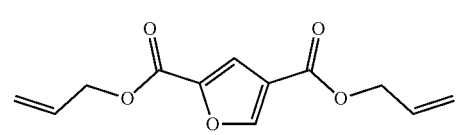

and; epoxidizing the ester to form the diglycidyl ester having a composition according to Formula 2:

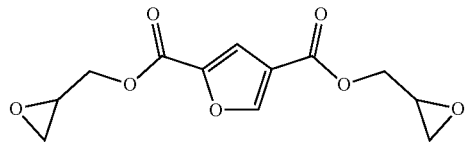

Formula 2

In an embodiment, the 2,4-FDCA is from renewable sources. In an embodiment, the allyl halide is selected from allyl bromide and allyl chloride. In an embodiment, epoxidizing the ester is mediated by one or more of performic acid, peracetic acid, meta-chloroperoxybenzoic acid or an enzyme.

The present disclosure also provides a method of making a diglycidyl ester, the method comprising: reacting 2,4-FDCA with epichlorodrine to form a diglycidyl ester having a composition according to Formula 2:

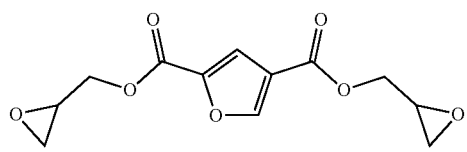

Formula 2

In an embodiment, the 2,4-FDCA is from a renewable source. In an embodiment, the epichloridrine is produced from a renewable source. In an embodiment, the renewable source is glycerin.

The present disclosure also provides a method of making a diglycidyl ether, the method comprising: reacting 2,4-FDME with epichlorodrine to form a diglycidyl ether having a composition according to Formula 3:

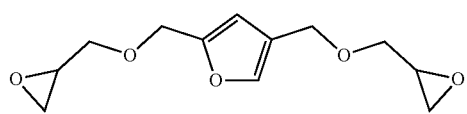

Formula 3

In an embodiment, the 2,4-FDME is from a renewable source. In an embodiment, the epichloridrine is produced from a renewable source. In an embodiment, the renewable source is glycerin.

The present disclosure also provides a method of making a diglycidyl ester, the method comprising: reacting 2,4-FDME with acrylic acid to form an ester having a composition according to Formula 4a:

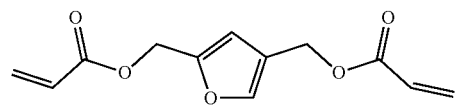

Formula 4a and; epoxidizing the ester to form the diglycidyl ester having a composition according to Formula 4:

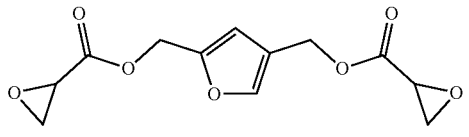

Formula 4

In an embodiment, the 2,4-FDME is from a renewable source. In an embodiment, the acrylic acid is from a renewable source. In an embodiment, epoxidizing the ester is mediated by one or more of performic acid, peracetic acid, meta-chloroperoxybenzoic acid or an enzyme.

The present disclosure provides a cured epoxy resin derived from one or more diglycidyl ethers or esters having a composition according to Formula 1 and a curing agent:

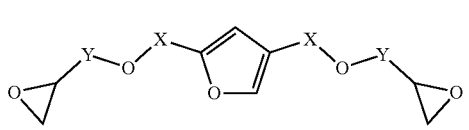

Formula 1 wherein X is selected from the group consisting of $CH_2$ and CO, wherein when X is $CH_2$, Y is selected from the group consisting of $CH_2$ and CO, and wherein when X is CO, Y is $CH_2$.

In an embodiment, the curing agent is an aliphatic amine selected from one or more of a linear or branched primary C2-C12 aliphatic amine, a linear or branched secondary C2-C12 aliphatic amine, or a linear or branched tertiary C3-C12 aliphatic amine.

In an embodiment, the curing agent is a cycloaliphatic amine. In an embodiment, the cycloaliphatic amine is selected from one or more of 3,3'-dimethylmethylene-di(cyclohexylamine), para-aminocyclohexylmethane (PACM), 1,2-diaminocyclohexane (1,2-DACH), and 1,4-diazobi-cyclo[2,2,2]octane (DABCO).

In an embodiment, the curing agent is an aromatic amine. In an embodiment, the aromatic amine is selected from one or more of meta-phenylenediamine (MPD), 4,4'-diaminodiphenylmethane (DDM), 4,4'-diamino-diphenylsulphone (DDS), and N,N-dimethylaniline (ARO).

In an embodiment, the curing agent is a mixture of curing agents selected from two or more of aliphatic, cycloaliphatic and aromatic amine curing agents.

In an embodiment, the curing agent is an anhydride having a formula $R^1$—C(O)—O—C(O)—$R^2$, wherein $R^1$ and $R^2$ are independently selected from C1-C19 hydrocarbon chains, wherein $R^1$ and $R^2$, together with the atoms to which they are attached, form a 5- to 10- membered saturated or unsaturated ring. In an embodiment, the curing agent is selected from maleic anhydride, succinic anhydride, adipic anhydride, dodecenylsuccinic anhydride (DDS), or a mixture thereof. In an embodiment, the curing agent is a saturated or unsaturated cyclic dicarboxylic anhydride. In an embodiment, the curing agent is selected from phthalic anhydride (PA), tetrahydrophthalic anhydride (THPA), hexahydrophthalic anhydride (HHPA), nadic methyl anhydride (NMA), methyltetrahydrophthalic anhydride (MTHPA), methylhexahydrophthalic anhydride (MHHPA), trimellitic anhydride, pyromellitic anhydride, benzophenone-3,3',4,4'-tetracarboxylic dianhydride, glycerol tris (trimellitate anhydride), maleic anhydride, tetrahydrophthalic anhydride, 3,6-endomethylene-1,2,3,6-tetrahydrophthalic anhydride, methyl endomethylene tetrahydrophthalic anhydride, or a mixture thereof In an embodiment, the ratio of active amine-hydrogens of the curing agent to epoxy groups of the diglycidyl ether or ester is about 0.5:1 to about 3:1 active amine-hydrogens: epoxy groups. In an embodiment, the ratio of active anhydride-hydrogens of the curing agent to epoxy groups of the diglycidyl ether or ester is about 0.5:1 to about 3:1 active anhydride-hydrogens:epoxy groups.

In an embodiment, the epoxy resin has a glass transition temperature between about 50° C. and about 250° C., more preferably between about 75° C. and about 185° C., as measured by tan delta peak of dynamic mechanical measurements in temperature scan mode.

In an embodiment, the epoxy resin has a higher tenacity than an otherwise equivalent cured epoxy resin produced with BPA-based diglycidyl ethers or esters.

The present disclosure also provides a method of making a cured epoxy resin comprising reacting a curing agent and a diglycidyl ether or ester having a composition according to Formula 1:

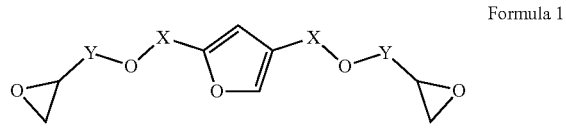

Formula 1 wherein X is selected from the group consisting of $CH_2$ and CO, wherein when X is $CH_2$, Y is selected from the group consisting of $CH_2$ and CO, and wherein when X is CO, Y is $CH_2$.

In an embodiment, the reacting is in the presence of a catalyst. In an embodiment, the catalyst is selected from one or more of trimethylamine, tetramethyl ammonium chloride, tetrabutyl ammonium bromide, cetyl trimethylammonium bromide, cetyltrimethylammonium bromide, and imidazoles such as methylimidazole. In an embodiment, the catalyst is present in an amount between about 0.1 and about 10 weight parts in relation to the total epoxy formulation.

In an embodiment, the reacting further comprises a second diglycidyl ether or ester, or an oxirane containing compound such as a diglycidyl ether of bisphenol A and F, mono-, di-, and/or tri-epoxidized cardanol, epoxidized eugenol, epoxidized vegetable oil, and epoxidized furans produced from a sugar.

The present disclosure also provides a composition comprising the epoxy resin as described herein. In an embodiment, the composition further comprises an additive. In an embodiment, the additive is selected from one or more of pigments and colorants, carbon black, impact and mechanical performance modifiers, antioxidants, acid and thermal stabilizers, oxygen scavengers, flame retardants, crystallization agents, flexibilizers, nucleating agents, foaming agents, and mold release agents. In an embodiment, the composition further comprises a filler. In an embodiment, the composition further comprises a reinforcement. In an embodiment, the reinforcement is modified or unmodified glass fiber, recycled glass fiber, modified or unmodified carbon fiber, recycled carbon fiber, thermoplastic fibers or natural fibers such as cellulosic fibers, lignocellulosic fibers and upcycled waste vegetable fibers.

The present disclosure also provides a product comprising the composition as described herein. In an embodiment, the product is selected from paints and coatings compositions, industrial tooling, electronic systems, composites and natural or synthetic fiber reinforced composites, composites for aerospace industry, composites for marine industry, adhesives and adhesive components, or construction materials and flooring.

DETAILED DESCRIPTION

The present disclosure provides diglycidyl ethers and esters derived from 2,4-FDCA and 2,4-FDME, preferably obtained by fermentative processes of bio-based sources. In some embodiments, the present disclosure provides diglycidyl ethers derived from 2,4-FDME. In some embodiments, the present disclosure provides diglycidyl esters derived from 2,4-FDME. In some embodiments, the present disclosure provides diglycidyl esters derived from 2,4-FDCA. In some embodiments, the present disclosure provides diglycidyl esters and ethers derived from 2,4-FDCA or 2,4-FDME that are produced in an oligomeric form. The present disclosure also provides cured epoxy resins obtained from such diglycidyl ethers and esters, as well as products and articles made from, coating, or comprising the cured epoxy resins.

As used herein, the singular forms "a," "an," and "the" include plural referents unless the context clearly dictates otherwise. Thus, for example, reference to "a carboxylic acid" includes a plurality of such carboxylic acids and reference to "the diol" includes reference to one or more diols, and so forth.

As used herein, the terms "comprises," "comprising," "includes," "including," "has," "having," "contains," "containing," or any other variation thereof, are intended to cover a non-exclusive inclusion. A composition, mixture, process, method, article, or apparatus that comprises a list of elements is not necessarily limited to only those elements but may include other elements not expressly listed or inherent to such composition, mixture, process, method, article, or apparatus. Further, unless expressly stated to the contrary, "or" refers to an inclusive "or" and not to an exclusive "or."

In the present disclosure, the term "bio-based" or "bio-" indicates that the compound derives from biogenic materials, therefore with the inclusion of renewable carbon, where the biogenic carbon is traceable by $^{14}C$ isotopic measurements. One can also refer to "bio-based" as "renewable," "bio-sourced," "natural derived," "plant-derived" or "plant-" or "from natural origin."

The term "cured epoxy resin," as used herein, refers to a synthetic polymer prepared by the reaction of one or more di- or multifunctional epoxy compounds with one or more curing agents, such as aliphatic amines, cycloaliphatic amines, aromatic amines, saturated anhydrides, unsaturated anhydrides, or cyclic anhydrides.

The term "residue," as used herein, means any organic structure incorporated into a polymer through a catalytic and/or enzymatic polymerization reaction (such as a polycondensation reaction) from the corresponding monomer.

In addition to the innovative diglycidyl ethers and esters, the present disclosure also provides the advantageous application of these diglycidyl ethers and esters in cured epoxy resin formulations. These formulations advantageously provide high mechanical properties, high thermal resistance, controlled exothermicity and improved biogenic carbon when compared to typical bisphenol A resins. Further, these formulations are suitable for curing at lower temperatures when compared to typical bisphenol A resins, leading to less energy intensive processes and therefore more environmentally friendly thermoset polymers. Moreover, cured epoxy resins produced with the inventive diglycidyl ethers and esters provide higher tenacity than otherwise equivalent cured epoxy resins produced with BPA-based diglycidyl ethers or esters. Without wishing to be bound by theory, it is believed that these improved properties result from the unique structural features attributed to the replacement of BPA by FDCA or FDME in the core moiety of the molecule. The disclosure herein advantageously provides one skilled in the art with the ability to overcome one of the most commonly observed limitations of BPA-based epoxides, which is the low tenacity and high brittleness that can negatively impact the final use of thermoset parts produced with such epoxy resins.

Diglycidyl Ethers and Esters

The diglycidyl ethers and esters disclosed herein include diglycidyl ethers and esters of 2,4-furandicarboxylic acid (2,4-FDCA) and 2,4-furandimethanol (2,4-FDME). In one aspect, the diglycidyl ether or ester has a structure of Formula 1:

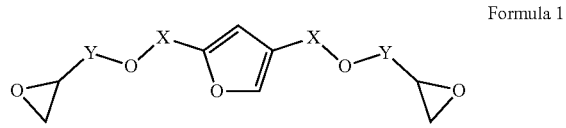

Formula 1 wherein X is selected from the group consisting of $CH_2$ and CO, wherein when X is $CH_2$, Y is selected from the group consisting of $CH_2$ and CO, and wherein when X is CO, Y is $CH_2$. In an embodiment, the diglycidyl ether has a structure of Formula 1, wherein X is $CH_2$ and Y is $CH_2$. In an embodiment, the diglycidyl ester has a structure of Formula 1, wherein X is $CH_2$ and Y is CO. In an embodiment, the diglycidyl ester has a structure of Formula 1, wherein X is CO and Y is $CH_2$.

In an embodiment, the diglycidyl ester has a structure of Formula 2:

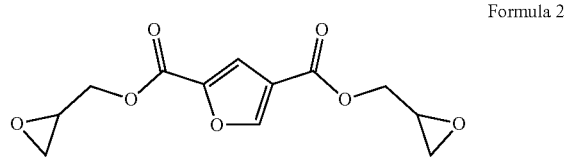 [SMILES: O=C(OCC1CO1)c1coc(C(=O)OCC2CO2)c1]

Formula 2

In an embodiment, the diglycidyl ether has a structure of Formula 3:

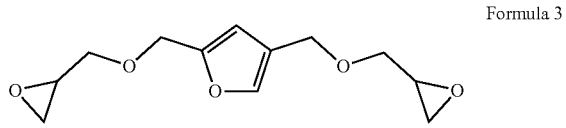 [SMILES: c1oc(COCC2CO2)cc1COCC1CO1]

Formula 3

In an embodiment, the diglycidyl ester has a structure of Formula 4:

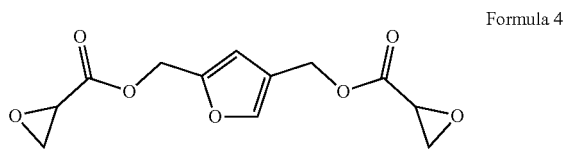 [SMILES: O=C(OCc1coc(COC(=O)C2CO2)c1)C1CO1]

Formula 4

Diglycidyl ethers and esters as disclosed herein can be prepared from bio-based and/or renewable sources, which can improve cost efficiencies and/or decrease environmental impact. The level of bio-based carbon in a diglycidyl ether or ester can be assessed according to test such as ASTM D6866. In an embodiment, a diglycidyl ether or ester as disclosed herein has a higher ratio of $^{14}C$ to $^{12}C$ as measured by ASTM D6866 when compared to a diglycidyl ether or ester prepared without using bio-based precursors or precursors from renewable sources. In an embodiment, a diglycidyl ester as disclosed herein has a higher ratio of $^{14}C$ to $^{12}C$ as measured by ASTM D6866 when compared to a diglycidyl ester comprising 2,5-furandicarboxylic acid instead of 2,4-furandicarboxylic acid. In an embodiment, a diglycidyl ether as disclosed herein has a higher ratio of $^{14}C$ to $^{12}C$ as measured by ASTM D6866 when compared to a diglycidyl ether comprising 2,5-furandimethanol instead of 2,4-furandimethanol.

Methods of Making Diglycidyl Ethers and Esters

The diglycidyl ethers and esters disclosed herein can be prepared from 2,4-FDCA or 2,4-FDME. For example, the diglycidyl ethers and esters disclosed herein can be prepared according to the synthetic routes shown in Scheme 1. In an embodiment, 2,4-FDCA is prepared from 4-hydroxymethylfurfural (4-HMF). In an embodiment, 2,4-FDME is prepared from 4-HMF. In an embodiment, 2,4-FDCA and 2,4-FDME are both prepared from 4-HMF. In an embodiment, 2,4-FDCA is prepared from sugar fermentation as described in U.S. Patent Application Publication No. 2020/0277639, the entire content of which is hereby incorporated by reference. In an embodiment, 2,4-FDME is prepared from sugar fermentation as described in U.S. patent application Ser. No. 17/163,838, the entire content of which is hereby incorporated by reference.

Scheme 1
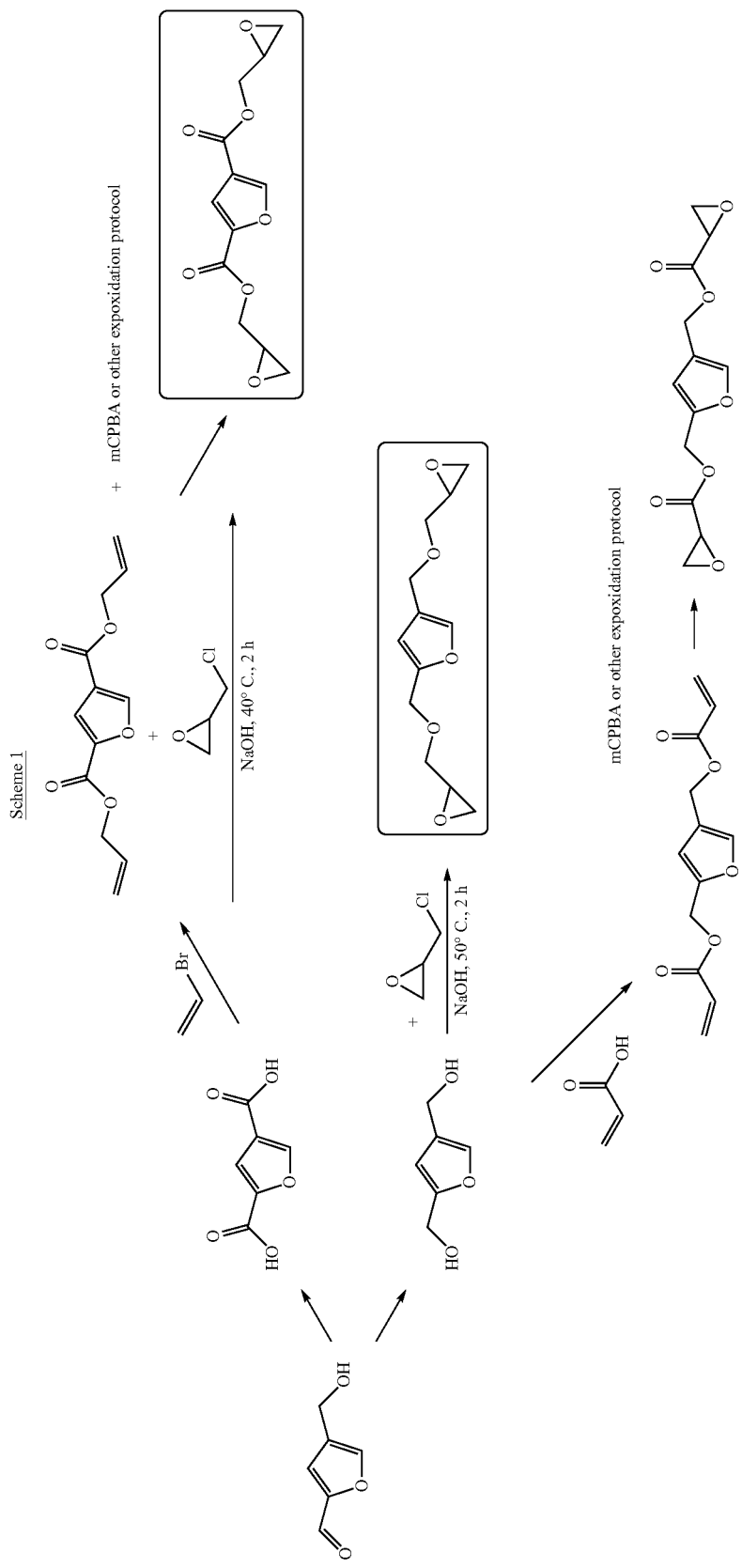

A diglycidyl ester can be prepared from 2,4-FDCA in a two-step process. In a first step, 2,4-FDCA is reacted with an allyl halide (e.g., allyl bromide or allyl chloride) to form an ester. In a second step, the ester is epoxidized to form the diglycidyl ester.

In an embodiment, a diglycidyl ester is prepared by reacting 2,4-FDCA with an allyl halide to form an ester having a structure of Formula 2a:

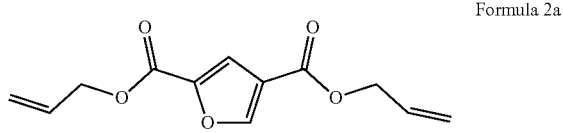 [SMILES: C=CCOC(=O)c1coc(C(=O)OCC=C)c1]

Formula 2a and epoxidizing the ester to form the diglycidyl ester having a structure of Formula 2:

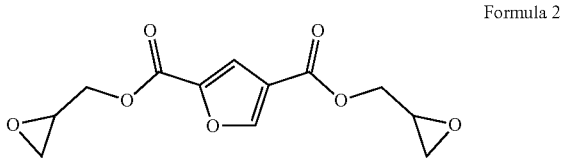 [SMILES: O=C(OCC1CO1)c1coc(C(=O)OCC2CO2)c1]

Formula 2

In an embodiment, the allyl halide is selected from allyl bromide and allyl chloride.

In an embodiment, the ester is epoxidized by reaction with one or more of performic acid, peracetic acid, meta-chloroperoxybenzoic acid, or an enzyme.

In an embodiment, the 2,4-FDCA is from renewable sources, including renewable carbon sources.

A diglycidyl ester can be prepared from 2,4-FDCA in a one-step process. In a one-step process, 2,4-FDCA is reacted with epichlorodrine to form the diglycidyl ester.

In an embodiment, a diglycidyl ester is prepared by reacting 2,4-FDCA with epichlorodrine to form a diglycidyl ester having a composition according to Formula 2:

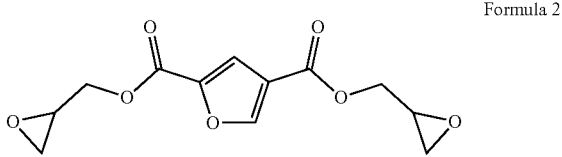 [SMILES: O=C(OCC1CO1)c1coc(C(=O)OCC2CO2)c1]

Formula 2

In an embodiment, the epichlorodrine is from a renewable resource, including renewable carbon sources. In an embodiment, the renewable resource is glycerin.

In an embodiment, the 2,4-FDCA is from renewable sources, including renewable carbon sources.

A diglycidyl ether can be prepared from 2,4-FDME in a one-step process. In a one-step process, 2,4-FDME is reacted with epichlorodrine to form the diglycidyl ether.

In an embodiment, a diglycidyl ether is prepared by reacting 2,4-FDME with epichlorodrine to form a diglycidyl ether having a composition according to Formula 3:

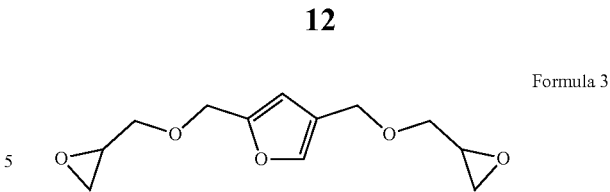

Formula 3

In an embodiment, the epichlorodrine is from a renewable resource, including renewable carbon sources. In an embodiment, the renewable resource is glycerin.

In an embodiment, the 2,4-FDME is from renewable sources, including renewable carbon sources.

A diglycidyl ester can be prepared from 2,4-FDME in a two-step process. In a first step, 2,4-FDME is reacted with acrylic acid to form an ester. In a second step, the ester is epoxidized to form the diglycidyl ester.

In an embodiment, a diglycidyl ester is prepared by reacting 2,4-FDME with acrylic acid to form an ester having a composition according to Formula 4a:

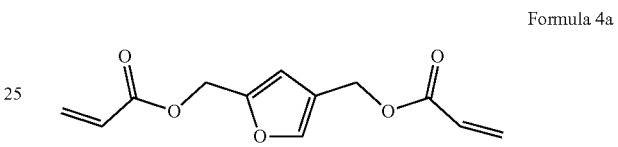

Formula 4a and epoxidizing the ester to form the diglycidyl ester having a composition according to Formula 4:

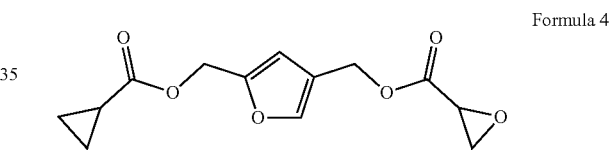

Formula 4

In an embodiment, the ester is epoxidized by reaction with one or more of performic acid, peracetic acid, meta-chloroperoxybenzoic acid, or an enzyme.

In an embodiment, the acrylic acid is from renewable sources, including renewable carbon sources.

In an embodiment, the 2,4-FDME is from renewable sources, including renewable carbon sources.

In an embodiment, the inventive diglycidyl ester and ethers can be present in an oligomeric form. The oligomeric form represent the inventive diglycidyl ester and ethers in a mixture comprised of the structures presented at Formulas 1 to 4 and dimers, trimers and other oligomers of the same produced via side-reactions promoted by diglycidilation agents such as epichloridrine. The oligomeric form can be defined according to analytical tools able to identify the chemical structure of the inventive diglycidyl ester and ethers and the distribuition of molecular weights, including but not limted to nuclear magnetic resonance (NMR), chromatography such as gas chromatography (GC), high-pressure liquid chromatography (HPLC) and mass spectroscopy (MS). As the oligomeric form represent a distribution of mono- and oligomeric species represented in Formulas 1 to 4, it can be commonly refered as having n that varies between 0.01 and 0.99.

In an embodiment, the inventive diglycidyl ester and ethers present in an oligomeric form can be further purified or separated to yield a composition free of oligomers. These oligomeric materials can be separated from the non-oligomeric compounds via physical or chemical adsorption such as column chromatography, flash chromatography, adsorption in activated charcoal in the presence of the appropriate eluent.

In some embodiments, the renewable carbon source may be selected from sugars, glycerol, alcohols, organic acids, alkanes, fatty acids, lignocellulose, proteins, carbon dioxide, and carbon monoxide. Renewable carbon sources may be first generation sugars, such as sugar cane and sugar beet, wheat, corn or soy, waste streams and agricultural sources, such as second generation sugars, but are not restricted to such waste streams. In one embodiment, the carbon source is a sugar. In one embodiment, the sugar is a monosaccharide. In one embodiment, the sugar is a polysaccharide. In one embodiment, the sugar is glucose or an oligomer of glucose. In one embodiment, the oligomer of glucose is selected from fructose, sucrose, starch, cellobiose, maltose, lactose and cellulose. In one embodiment, the sugar is a five carbon sugar. In one embodiment, the sugar is a six carbon sugar. In some embodiments, the renewable carbon source (i.e., feedstock) comprises one or more five carbon sugars and/or one or more six carbon sugars. In some embodiments, the feedstock comprises one or more of xylose, glucose, arabinose, galactose, maltose, fructose, mannose, sucrose, and/or combinations thereof. In some embodiments, the feedstock comprises one or more of xylose and/or glucose. In some embodiments, the feedstock comprises one or more of arabinose, galactose, maltose, fructose, mannose, sucrose, and/or combinations thereof In another embodiment, 2,4-FDCA is produced via catalytic routes comprising several synthetic steps as described in Org. Proc. Res. Dev. 2003, 7, 1, 74-81, Anti-Infective Agents, 2012, 10, 55-71 and ACS Sustainable Chem. Eng. 2016, 4, 3, 1707-1714.

In another embodiment, 2,4-FDCA is produced enzymatically to produce bio-based 2,4-FDCA, for example, as described in U.S. Patent Application Publication No. 2020/0277639, the entire content of which is hereby incorporated by reference. In some embodiments a method of producing 2,4-FDCA comprises cultivating a recombinant microorganism in a culture medium containing a feedstock providing a carbon source until the 2,4-FDCA is produced. In some embodiments a method of producing 2,4-FDCA comprises cultivating a recombinant microorganism in a culture medium containing a feedstock providing a carbon source until the 2,4-FDME is further oxidized to 2,4-FDCA, through procedures known by one skilled in the art. The optional utilization of renewable materials to produce 2,4-FDCA is a feature that permits the inventive copolymers to contain different levels of bio-based carbon, as typically assessed according to ASTM D6866.

In another embodiment, the 2,4-FDCA or its derivative is obtained from bio-based or petrochemical sources and catalytic pathways, e.g., those described in U.S. Pat. Nos. 9,284,290, 8,455,668, Green Chem., 2014, 16, 1957-1966, and ACS Sustainable Chem. Eng. 2016, 4, 3, 1707-1714. U.S. Pat. Nos. 9,284,290 and 8,455,668 are incorporated by reference herein in their entireties. In some embodiments a method for synthesizing 2,4-FDCA by a disproportionation route comprises the following steps: a) oxidizing furfural compounds in the presence of catalysts and alkaline solution in order to obtain biobased furoic acid salts, wherein the catalysts are selected from the group consisting of Au/TiO$_2$, Au/C, Au/ZnO, Au/Fe$_2$O$_3$ or other Au catalysts; b) heating the furoic acid salts under stirring in the presence of a metal based catalyst to prepare a reaction mixture and cooling the reaction mixture until room temperature; c) collecting furan from the reaction mixture obtained in item b) in order to obtain the mixture of 2,4-FDCA and 2,5-FDCA; and d) subjecting the mixture obtained in item c) to an extraction or other separation method in order to collect and purify 2,4-FDCA.

In another embodiment, 2,4-FDME is produced enzymatically to produce bio-based 2,4-FDME, for example, as described in U.S. patent application Ser. No. 17/163,838. In some embodiments a method of producing 2,4-FDME comprises cultivating a recombinant microorganism in a culture medium containing a feedstock providing a carbon source until the 2,4-FDME is produced. The optional utilization of renewable materials to produce 2,4-FDME is a feature that permits the inventive copolymers to contain different levels of bio-based carbon, as typically assessed according to ASTM D6866.

Cured Epoxy Resins

The diglycidyl ethers and esters disclosed herein can be subjected to conditions that cure (or harden) the low molecular weight diglycidyl ether or ester monomers to form a three-dimensional macromolecular network. The transformation from low molecular weight monomer into a cured epoxy resin is promoted by the use of crosslinking agents, also known as curing agents or hardeners.

In one aspect, the cured epoxy resin is derived from one or more diglycidyl ethers or esters having a structure of Formula 1 and a curing agent:

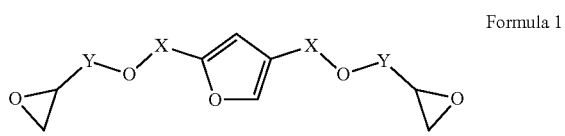

Formula 1 wherein X is selected from the group consisting of CH$_2$ and CO, wherein when X is CH$_2$, Y is selected from the group consisting of CH$_2$ and CO, and wherein when X is CO, Y is CH$_2$.

In an embodiment, the cured epoxy resin is a three-dimensional macromolecular network comprising crosslinked residues of the diglycidyl ethers or esters of Formula 1 with a curing agent.

In an embodiment, the cured epoxy resin is prepared by the process of crosslinking one or more diglycidyl ethers or esters having a structure of Formula 1 with a curing agent.

In an embodiment, the cured epoxy resin is prepared by the process of crosslinking one or more diglycidyl ethers or esters present in oligomeric forms with a curing agent.

In an embodiment, the curing agent is an aliphatic amine selected from one or more of a linear or branched primary C2-C12 aliphatic amine, a linear or branched secondary C2-C12 aliphatic amine, or a linear or branched tertiary C3-C12 aliphatic amine. Linear or branched primary C2-C12 aliphatic amines include, but are not limited to, linear C2 aliphatic amines, linear or branched primary C3 aliphatic amines, linear or branched primary C4 aliphatic amines, linear or branched primary C5 aliphatic amines, linear or branched primary C6 aliphatic amines, linear or branched primary C7 aliphatic amines, linear or branched primary C8 aliphatic amines, linear or branched primary C9 aliphatic amines, linear or branched primary C10 aliphatic amines, linear or branched primary C11 aliphatic amines, and/or linear or branched primary C12 aliphatic amines. Linear or branched secondary C2-C12 aliphatic amines include, but are not limited to, linear C2 aliphatic amines, linear secondary C3 aliphatic amines, linear or branched secondary C4 aliphatic amines, linear or branched secondary C5 aliphatic amines, linear or branched secondary C6 aliphatic amines, linear or branched secondary C7 aliphatic amines, linear or branched secondary C8 aliphatic amines, linear or branched secondary C9 aliphatic amines, linear or branched secondary C10 aliphatic amines, linear or branched secondary C11 aliphatic amines, and/or linear or branched secondary C12 aliphatic amines. Branched tertiary C3-C12 aliphatic amines include, but are not limited to, linear tertiary C3 aliphatic amines, linear tertiary C4 aliphatic amines, linear or branched tertiary C5 aliphatic amines, linear or branched tertiary C6 aliphatic amines, linear or branched tertiary C7 aliphatic amines, linear or branched tertiary C8 aliphatic amines, linear or branched tertiary C9 aliphatic amines, linear or branched tertiary C10 aliphatic amines, linear or branched tertiary C11 aliphatic amines, and/or linear or branched tertiary C12 aliphatic amines.

In an embodiment, the curing agent is a cycloaliphatic amine. Suitable cycloaliphatic amines include, but are not limited to, C2-C12 secondary or tertiary cycloaliphatic amines, such as C2 secondry cycloaliphatic amines, C3 secondry cycloaliphatic amines, C4 secondry cycloaliphatic amines, C5 secondry cycloaliphatic amines, C6 secondry cycloaliphatic amines, C7 secondry cycloaliphatic amines, C8 secondry cycloaliphatic amines, C9 secondry cycloaliphatic amines, C10 secondry cycloaliphatic amines, C11 secondry cycloaliphatic amines, C12 secondry cycloaliphatic amines, C3 tertiary cycloaliphatic amines, C4 tertiary cycloaliphatic amines, C5 tertiary cycloaliphatic amines, C6 tertiary cycloaliphatic amines, C7 tertiary cycloaliphatic amines, C8 tertiary cycloaliphatic amines, C9 tertiary cycloaliphatic amines, C10 tertiary cycloaliphatic amines, C11 tertiary cycloaliphatic amines, and/or C12 tertiary cycloaliphatic amines. In an embodiment, the cycloaliphatic amine is selected from one or more of 3,3'-dimethylmethylene-di(cyclohexylamine), isophoronediamine (IPDA), para-aminocyclohexylmethane (PACM), 1,2-diaminocyclohexane (1,2-DACH), and 1,4-diazobi-cyclo[2,2,2]octane (DABCO).

In an embodiment, the curing agent is an aromatic amine. In an embodiment, the aromatic amine is selected from one or more of meta-phenylenediamine (MPD), 4,4'-diaminodiphenylmethane (DDM), 4,4'-diamino-diphenylsulphone (DDS), diethyltoluenediamine (DETDA) and N,N-dimethylaniline (ARO).

In an embodiment, the curing agent comprises a mixture of two or more curing agents as disclosed herein. In an embodiment, the curing agent is a mixture of two or more aliphatic curing agents, two or more cycloaliphatic curing agents, or two or more aromatic amine curing agents. In an embodiment, the curing agent is a mixture of an aliphatic curing agent and a cycloaliphatic curing agent. In an embodiment, the curing agent is a mixture of an aliphatic curing agent and an aromatic amine curing agent. In an embodiment, the curing agent is a mixture of a cycloaliphatic curing agent and an aromatic amine curing agent. In an embodiment, the curing agent is a mixture of an aliphatic curing agent, a cycloaliphatic curing agent, and an aromatic amine curing agent. In an embodiment, the curing agent is a mixture of curing agents selected from two or more of aliphatic, cycloaliphatic, and aromatic amine curing agents.

In an embodiment, the curing agent is an anhydride having a formula $R^1$—C(O)—O—C(O)—$R^1$, wherein $R^1$ and $R^2$ are independently selected from C1-C19 hydrocarbon chains, wherein $R^1$ and $R^2$, together with the atoms to which they are attached, form a 5- to 10-membered saturated or unsaturated ring, such as a 5-, 6-, 7-, 8-, 9-, or 10-membered saturated or unsaturated ring. Suitable $R^1$ and $R^2$ moieties include, but are not limited to, a C1 hydrocarbon chain, C2 hydrocarbon chains, C3 hydrocarbon chains, C4 hydrocarbon chains, C5 hydrocarbon chains, C6 hydrocarbon chains, C7 hydrocarbon chains, C8 hydrocarbon chains, C9 hydrocarbon chains, C10 hydrocarbon chains, C11 hydrocarbon chains, C12 hydrocarbon chains, C13 hydrocarbon chains, C14 hydrocarbon chains, C15 hydrocarbon chains, C16 hydrocarbon chains, C17 hydrocarbon chains, C18 hydrocarbon chains, and/or C19 hydrocarbon chains. In an embodiment, the curing agent is selected from maleic anhydride, succinic anhydride, adipic anhydride, dodecenylsuccinic anhydride (DDS), or a mixture thereof. In an embodiment, the curing agent is a saturated cyclic dicarboxylic anhydride. In an embodiment, the curing agent is an unsaturated cyclic dicarboxylic anhydride.

In an embodiment, the curing agent is selected from phthalic anhydride (PA), tetrahydrophthalic anhydride (THPA), hexahydrophtalic anhydride (HHPA), nadic methyl anhydride (NMA), methyltetrahydrophthalic anhydride (MTHPA), methylhexahydrophthalic anhydride (MHHPA), trimellitic anhydride, pyromellitic anhydride, benzophenone-3,3',4,4'-tetracarboxylic dianhydride, glycerol tris(trimellitate anhydride), maleic anhydride, dihydrophthalic anhydride, 3,6-endomethylene-1,2,3,6-tetrahydrophthalic anhydride, methyl endomethylene tetrahydrophthalic anhydride, or a mixture thereof In an embodiment, the cured epoxy resin has a glass transition temperature between about 50° C. and about 250° C., as measured by the change in the heat capacity in calorimetric curves obtained in dynamic scanning calorimetry (DSC) in temperature scan mode, for example, the cured epoxy resin has a glass transition temperature between about 60° C. and about 240° C., between about 70° C. and about 230° C., between about 80° C. and about 220° C., between about 90° C. and about 210° C., between about 100° C. and about 200° C., between about 110° C. and about 190° C., between about 120° C. and about 180° C., between about 125° C. and about 175° C., between about 130° C. and about 170° C., between about 140° C. and about 160° C., between about 75° C. and about 185° C., between about 50° C. and about 60° C., between about 60° C. and about 70° C., between about 70° C. and about 75° C., between about 75° C. and about 80° C., between about 80° C. and about 90° C., between about 90° C. and about 100° C., between about 100° C. and about 110° C., between about 110° C. and about 120° C., between about 120° C. and about 130° C., between about 130° C. and about 140° C., between about 140° C. and about 150° C., between about 150° C. and about 160° C., between about 160° C. and about 170° C., between about 170° C. and about 180° C., between about 180° C. and about 185° C., between about 185° C. and about 190° C., between about 190° C. and about 200° C., between about 200° C. and about 210° C., between about 210° C. and about 220° C., between about 220° C. and about 230° C., between about 230° C. and about 240° C., and/or between about 240° C. and about 250° C.

In an embodiment, the ratio of active amine-hydrogens of the curing agent to epoxy groups of the diglycidyl ether or ester provided and/or present is about 0.5:1 to about 3:1 active amine-hydrogens:epoxy groups, such as about 0.7:1 to about 2.5:1, about 1:1 to about 2:1, about 1.2:1 to about 1.7:1, about 0.5:1 to about 0.6:1, about 0.6:1 to about 0.7:1, about 0.7:1 to about 0.8:1, about 0.8:1 to about 0.9:1, about 0.9:1 to about 1:1, about 1:1 to about 1.1:1, about 1.1:1 to about 1.2:1, about 1.2:1 to about 1.3:1, about 1.3:1 to about 1.4:1, about 1.4:1 to about 1.5:1, about 1.5:1 to about 1.6:1, about 1.6:1 to about 1.7:1, about 1.7:1 to about 1.8:1, about 1.8:1 to about 1.9:1, about 1.9:1 to about 2:1, about 2:1 to about 2.1:1, about 2.1:1 to about 2.2:1, about 2.2:1 to about 2.3:1, about 2.3:1 to about 2.4:1, about 2.4:1 to about 2.5:1, about 2.5:1 to about 2.6:1, about 2.6:1 to about 2.7:1, about 2.7:1 to about 2.8:1, about 2.8:1 to about 2.9:1, and/or about 2.9:1 to about 3:1. In an embodiment, the amine-hydrogens of the curing agent and epoxy groups of the diglycidyl ether or ester are provided to obtain the cured epoxy resin. In an embodiment, the amine-hydrogens of the curing agent and epoxy groups of the diglycidyl ether or ester are present in the cured epoxy resin.

In an embodiment, the ratio of active anhydride-hydrogens of the curing agent to epoxy groups of the diglycidyl ether or ester provided and/or present is about 0.5:1 to about 3:1 active anhydride-hydrogens:epoxy groups, such as about 0.7:1 to about 2.5:1, about 1:1 to about 2:1, about 1.2:1 to about 1.7:1, about 0.5:1 to about 0.6:1, about 0.6:1 to about 0.7:1, about 0.7:1 to about 0.8:1, about 0.8:1 to about 0.9:1, about 0.9:1 to about 1:1, about 1:1 to about 1.1:1, about 1.1:1 to about 1.2:1, about 1.2:1 to about 1.3:1, about 1.3:1 to about 1.4:1, about 1.4:1 to about 1.5:1, about 1.5:1 to about 1.6:1, about 1.6:1 to about 1.7:1, about 1.7:1 to about 1.8:1, about 1.8:1 to about 1.9:1, about 1.9:1 to about 2:1, about 2:1 to about 2.1:1, about 2.1:1 to about 2.2:1, about 2.2:1 to about 2.3:1, about 2.3:1 to about 2.4:1, about 2.4:1 to about 2.5:1, about 2.5:1 to about 2.6:1, about 2.6:1 to about 2.7:1, about 2.7:1 to about 2.8:1, about 2.8:1 to about 2.9:1, and/or about 2.9:1 to about 3:1. In an embodiment, the anhydride-hydrogens of the curing agent and epoxy groups of the diglycidyl ether or ester are provided to obtain the cured epoxy resin. In an embodiment, the anhydride-hydrogens of the curing agent and epoxy groups of the diglycidyl ether or ester are present in the cured epoxy resin.

In an embodiment, the curing agent (or the curing agent residue) and the diglycidyl ether or ester (or the diglycidyl ether or ester residue) are provided and/or are present in a stoichiometric molar ratio of about 0.5:1 to about 3:1 curing agent:diglycidyl ether or ester, such as about 0.7:1 to about 2.5:1, about 1:1 to about 2:1, about 1.2:1 to about 1.7:1, about 0.5:1 to about 0.6:1, about 0.6:1 to about 0.7:1, about 0.7:1 to about 0.8:1, about 0.8:1 to about 0.9:1, about 0.9:1 to about 1:1, about 1:1 to about 1.1:1, about 1.1:1 to about 1.2:1, about 1.2:1 to about 1.3:1, about 1.3:1 to about 1.4:1, about 1.4:1 to about 1.5:1, about 1.5:1 to about 1.6:1, about 1.6:1 to about 1.7:1, about 1.7:1 to about 1.8:1, about 1.8:1 to about 1.9:1, about 1.9:1 to about 2:1, about 2:1 to about 2.1:1, about 2.1:1 to about 2.2:1, about 2.2:1 to about 2.3:1, about 2.3:1 to about 2.4:1, about 2.4:1 to about 2.5:1, about 2.5:1 to about 2.6:1, about 2.6:1 to about 2.7:1, about 2.7:1 to about 2.8:1, about 2.8:1 to about 2.9:1, and/or about 2.9:1 to about 3:1.

In an embodiment, the glass transition temperature of the resulting curing system can be adapted according to the rigidity of the furan-derived structure or the hardening agent and its quantity in the final composition.

In some embodiments at least one of the components of cured epoxy resin is of renewable origin, i.e, is produced from renewable sources such as agricultural feedstock, agricultural waste, organic waste products, biomass, $CO_2$, CO and microorganisms that possess biogenic carbon as detectable by $^{14}C$ measurements carried out by ASTM 6866. In some embodiments, the cured epoxy resins described herein have a higher ratio of $^{14}C$ to $^{12}C$ as measured by ASTM D6866 when compared to a cured epoxy resin prepared without using bio-based precursors or precursors from renewable sources. In some embodiments, the cured epoxy resins described herein have a higher ratio of $^{14}C$ to $^{12}C$ as measured by ASTM D6866 when compared to a diglycidyl ether or ester comprising 2,5-furandicarboxylic acid instead of 2,4-furandicarboxylic acid. The component of renewable origin may be one or more of 2,4-FDCA, 2,4-FDME, epichlorodrine, and one or more other components.

Methods of Making Cured Epoxy Resins

The diglycidyl ethers and esters disclosed herein can be cured to form cured epoxy resins by providing a curing agent in the presence of a diglycidyl ether or ester. In an embodiment, the method of making a cured epoxy resin comprises reacting a curing agent and a diglycidyl ether or ester having a structure of Formula 1:

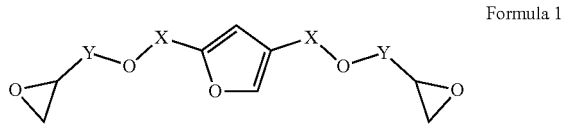

Formula 1 wherein X is selected from the group consisting of $CH_2$ and CO, wherein when X is $CH_2$, Y is selected from the group consisting of $CH_2$ and CO, and wherein when X is CO, Y is $CH_2$.

In an embodiment, the reacting is in the presence of a catalyst. In an embodiment, the catalyst is selected from one or more of trimethylamine, tetramethyl ammonium chloride, tetrabutyl ammonium bromide, cetyl trimethylammonium bromide, cetyltrimethylammonium bromide, and imidazoles such as methylimidazole.

In an embodiment, the catalyst is present in an amount between about 0.1 and about 10 weight parts in relation to the total epoxy formulation. Suitable catalyst amounts include, but are not limited to, about 0.1 wt % to about 10 wt % based on total weight of a catalyst, curing agent and diglycidyl ether or ester, such as about 0.2 wt % to about 0.3 wt %, about 0.3 wt % to about 0.4 wt %, about 0.4 wt % to about 0.5 wt %, about 0.5 wt % to about 0.6 wt %, about 0.6 wt % to about 0.7 wt %, about 0.7 wt % to about 0.8 wt %, about 0.8 wt % to about 0.9 wt %, about 0.9 wt % to about 1 wt %, about 1 wt % to about 2 wt %, about 2 wt % to about 5 wt %, and/or about 5 wt % to about 10 wt %.

In an embodiment, the reacting further comprises a second diglycidyl ether or ester (such as a diglycidyl ether or ester of Formula 1, Formula 2, Formula 3, or Formula 4, or a combination thereof in forms presented at the above Formulas or oligomeric form) or an oxirane-containing compound. In an embodiment, the second diglycidyl ether or ester or the oxirane-containing compound is selected from a diglycidyl ether of bisphenol A, a diglycidyl ether of bisphenol F, mono-, di-, and/or tri-epoxidized cardanol, epoxidized eugenol, epoxidized vegetable oil, or epoxidized furans produced from a sugar.

Compositions and Articles

Applications for the cured epoxy resins include, but are not limited to, paints, coating compositions, industrial tooling (such as molds, master models, laminates, castings, fixtures, and other industrial production aids), electronic systems (such as motors, generators, transformers, switchgear, bushings, insulators, printed wiring boards (PWB), and semiconductor encapsulants), composites and natural or synthetic fiber reinforced composites, composites for the aerospace industry (including materials reinforced by fiber, wherein the fiber reinforcements may include glass, carbon, Kevlar, and boron.), composites for the marine industry, adhesives and adhesive components, and construction materials and flooring.

In one aspect, a composition comprises the cured epoxy resin as disclosed herein.

In an embodiment, the composition further comprises an additive. In an embodiment, the additive is selected from one or more of pigments, colorants, carbon black, impact performance modifiers, mechanical performance modifiers, antioxidants, acid stabilizers, thermal stabilizers, oxygen scavengers, flame retardants, crystallization agents, flexibilizers, nucleating agents, foaming agents, and mold release agents.

In an embodiment, the composition further comprises a filler or a reinforcement. In an embodiment, the reinforcement is selected from modified or unmodified glass fiber, recycled glass fiber, modified or unmodified carbon fiber, recycled carbon fiber, thermoplastic fibers, or natural fibers such as cellulosic fibers, lignocellulosic fibers, and upcycled waste vegetable fibers.

In an embodiment, the composition comprising the epoxy resin, curing agent, catalysts and additives are processed by molding or shaping the cured epoxy resin articles, for examples by resin sheet moulding compound, pultrusion, filament winding, resin transfer moulding, vacuum assisted resin transfer moulding, and other techniques that impregnate resin into a fibrous material or give shape to or cure a liquid resin.

EXAMPLES

Example 1

Preparation of Diglycidyl Ether of 2,4-FDME

A NaOH solution at 50 wt % (101.5 g, 2.5 mol), epichlorohydrin (274 g, 2.96 mol) and catalyst TBBr (6.8 g, 0.021 mol) were mixed at room temperature during 30 min. The solution was then heated at 50° C. and FDME (27 g, 0.21 mol) dissolved in 190 g THF was added dropwise over 45 min. The reaction was stopped after 75 min when 2,4-FDME was completely consumed by adding water. The product was extracted from water with 500 mL of ethyl acetate and washed three times with 1 L of water to remove residual catalyst TBBr. The organic phase was then washed five times with hexane to remove residual epichlorohydrin. The product was finally dried under vacuum as yellow liquid with the presence of oligomeric species. This material was further purifired by flash chromatography with ethyl acetate/hexane as eluent (50/50), resulting in a species free of oligomers.

Example 2

Characterization of Diglycidyl Ether of 2,4-FDME

Inventive diglycidyl ethers produced in Example 1 were characterized over size-exclusion chromatography (GPC) in a VARIAN PL-GPC-50 Plus using THF as mobile phase and the following columns: precolumn Polypore (7.5×50 mm, 5 μm) and 2 columns Polypore (7.5×300 mm, 5 μm). Chromatogram has indicated that the product without passing through the flash chromatography contained about 18% of oligomers. This information was further confirmed by $^1$H NMR using samples dissoluted in acetone-d6 and analysed in a BRUKER AVANCE 300 MHz equipment. Oligomers were evidenced by the presence of multiplets in the 3.5 ppm chemical shift zone and associated with the protons in the epoxide group. These oligomeric species are not detected neither by GPC or by $^1$H NMR after the separation step. Another key signals present in the 1H NMR spectrum are those detected in the 2.5-3.0 ppm chemical shift, associated with the functionalization of the 2,4-FDME moiety with oxiranes.

Example 3

Preparation of Diglycidyl Ester of 2,4-FDCA 2,4-FDCA (16 g, 0.10 mol) and catalyst TBBr (2.15 g, 6.67 mmol) were dissolved in epichlorohydrin (189.8 g, 2.05 mol), leading to a white suspension. The mixture was then heated at 90° C. during 1 h and became an orange/brown liquid. After 1 h, the solution was cooled down and excess of epichlorohydrin was removed under reduced pressure. The resulting orange oil was dissolved in 85 mL DCM and a new portion of TBBr (4.3 g, 0.013 mol) was added. Then, NaOH solution at 20 wt % (9 g, 0.226 mol) was added dropwise to the medium at room temperature. The reaction was stirred at room temperature and stopped after 30 min by adding 200 mL of water. The organic phase was collected, and the product was extracted from water by washing the aqueous phase three times with 200 mL DCM. The organic phases were gathered and washed four times with 200 mL of water to remove residual TBBr, before being dried over anhydrous sodium sulfate. DCM was evaporated under vacuum and the resulting orange oil was washed with hexane to remove residual epichlorohydrin. The product was finally dried under reduced pressure, leading to an orange oil that crystallized at rest.

In another embodiment, the diglycidyl ester of 2,4-FDCA was produced in via an ally halide chemical route. 2,4-FDCA (10 g, 0.06 mol) and $K_2 CO_3$ (35.4 g, 0.26 mol) were dissolved in 85 g of DMF (85 g). After few minutes of stirring, allyl bromide (31 g, 0.26 mol) was added and the reaction was heated at 50° C. during 24 h. Excess of $K_2 CO_3$ was removed filtration and excess of allyl bromide was removed under reduced pressure. The product was then extracted from DMF by washing four time with a mixture of DCM and water. The organic phases were dried over anhydrous sodium sulfate and DCM was evaporated under vacuum. The resulting product was a brown liquid with a purity of 94% (7 g, 46% yield), that was not further purified.

Example 4

Characterization of Diglycidyl Esters of 2,4-FDCA

Inventive diglycidyl esters produced in Example 3 had their chemical structure characterized and confirmed via $^1$H NMR. Samples were dissoluted in acetone-d6 and analysed in a BRUKER AVANCE 300 MHz equipment. The modification of the 2,4-FDCA moiety with oxirane rings was characterized by signals associated with the protons in the epoxide group, presenting a characteristic chemical shift between 2.5 and 3.0 ppm. More importantly, the presence of oligomeric species produced via the epichloridrine route was evidence by signals in the 3.8 ppm chemical shift region, which are attributed to ring-opened moieties formed by side reactions during the diglycidilation. These signals are not present in the allyl halide route.

Example 5

Characterization of Thermal Behavior of Inventive Diglycidyl Ethers and Esters Thermal stability of the inventive diglycidyl ether and ethers was determined by TGA (thermogravimetric analysis). These analyses are run using approximately 10 mg of the compound sample, from room temperature to 730° C., under synthetic air atmosphere, heating rate of 10° C. min$^{-1}$ using a TGA Discovery 550 (TA Instruments) Thermogravimetric curves demonstrate that the inventive esters and ethers are thermally stable up to 189° C., as determined by the point where samples have lost 5% of weight due to degradation. Moreover, all samples demonstrated a thermal stability compatible with the cure temperatures typically explored in the state of art.

TABLE 1

Thermal transition temperaturature ($T_g$) of the inventive epoxides and comparative example

| Inventive Epoxy | Structure | Td 5% (° C.) |
|---|---|---|
| 1 | DG-FDCA (Oligomers) | 140 |
| 2 | DG-FDCA | 189 |
| 3 | DG-FDME (Oligomers) | 154 |
| 4 | DG-FDME | 150 |

Example 5

Curing of Diglycidyl Ether of 2,4-FDME and Diglycidyl Ester of 2,4-FDCA

Resin formulations were prepared by combining the inventive diglycidyl ethers and esters prepared in Examples 1 and 3 with amine and anhydride curing agents. Equimolar parts of the diglycidyl ethers or esters and of the curing agents were added in a cup together thoroughly mixed to form a homogeneous solution.

Formulations were cast into silicon molds with uniform dimensions (e.g. 10 m×40 m×5 mm) and the cure conditions were adjusted according to the curing agent selected, as presented in Table 2. Curing conditions included time and temperatures adjusted according to the curing system selected. For the IPDA hardener (cycloaliphatic), formulations were heated 1 h at 50° C., 2 h at 130° C. and 30 min at 170° C. For the DETDA hardener (aromatic), the formulation was heated 15 min at 100° C., 1 h at 150° C. and 1 h at 180° C. After the curing process, all liquid resins hardened as an indication of the curing reaction, which creates the thermoset polymer network

TABLE 2

Compositions and curing conditions of the inventive epoxides and comparative example

| Formulation | Epoxy | Curing Agent | Curing Conditions |
|---|---|---|---|
| 1 | DG-FDCA (Oligomers) | Cycloaliphatic | 1 h at 50° C., 2 h at 130° C. and 30 min at 170° C. |
| 2 | DG-FDCA (Oligomers) | Aromatic | 15 min at 100° C., 1 h at 150° C. and 1 h at 180° C. |
| 3 | DG-FDCA | Cycloaliphatic | 1 h at 50° C., 2 h at 130° C. and 30 min at 170° C. |
| 4 | DG-FDCA | Aromatic | 15 min at 100° C., 1 h at 150° C. and 1 h at 180° C. |
| 5 | DG-FDME (Oligomers) | Cycloaliphatic | 1 h at 50° C., 2 h at 130° C. and 30 min at 170° C. |
| 6 | DG-FDME (Oligomers) | Aromatic | 15 min at 100° C., 1 h at 150° C. and 1 h at 180° C. |
| 7 | DG-FDME | Cycloaliphatic | 1 h at 50° C., 2 h at 130° C. and 30 min at 170° C. |
| 8 | DG-FDME | Aromatic | 15 min at 100° C., 1 h at 150° C. and 1 h at 180° C. |
| 9 | DGEBA | Commercial | As recommended |

Example 6

Characterization of 2,4-FDME Diglycidyl Ethers and Esters Before and After Curing The cure reaction between the epoxide and curing agent was tracked by dynamic scanning calorimetry. Compositions were analyzed by DSC in Heat/Cool/Heat cycles from 0° C. to 250° C. at 10° C./min, under inert atmosphere. As demonstrated in Table 3, samples produced with all combinations of epoxide-bearing furanic molecules and curing agents produce hardened materials with $T_g$s comparable with the comparative example and other formulations typically described in the state of the art. The use of 2,4-FDME moiety can lead to networks with improved flexibility over 2,4-FDCA as evidence by the $T_g$, hence finding a fit with applications where toughness is preferred over rigidity.

TABLE 3

Glass transition temperaturature ($T_g$) of the inventive epoxides and comparative example

| Formulation | Glass Transition Temperature (° C.) |
|---|---|
| 1 | 115 |
| 2 | 130 |
| 3 | 76 |
| 4 | 124 |
| 5 | 50 |
| 6 | 75 |
| 7 | 61 |
| 8 | 57 |
| 9 | 132 |

The reaction was also tracked by FTIR (Fourier Transformation Infrared) spectroscopy. The disappearance of the absorption bands related to the epoxy group in the 1250 and 850 cm$^{-1}$ (C—O—C stretching in the oxirane ring) confirms that the oxirane rings are consumed during the network formation phenomenon in all formulations containing the inventive diepoxide.

Example 7

Characterization of Thermal Behavior of Cured Materials

Thermal stability of the cured systems was determined by TGA (thermogravimetric analysis). These analyses are run using approximately 10 mg of the compound sample, from room temperature to 1000° C., under $N_2$ atmosphere, heating rate of 10° C. $min^{-1}$. Thermogravimetric curves demonstrate that all inventive molecules led to crosslinked networks thermally stable up to 340° C., as determined by the point where samples have lost 5% of weight due to degradation, whilst a 50% weight loss was observed up to 398° C. These observations confirm that the inventive molecules can produce crosslinked with suitable thermal stability for a wide range of applications today dependent on bisphenol A resins and where thermal resistance is demanded.

The invention claimed is:

1. A diglycidyl ether or ester having a composition according to Formula 1:

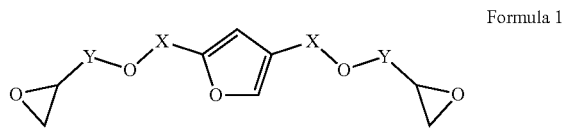

Formula 1 wherein X is selected from the group consisting of $CH_2$ and CO,
wherein when X is $CH_2$, Y is selected from the group consisting of $CH_2$ and CO, and
wherein when X is CO, Y is $CH_2$.

2. The diglycidyl ester of claim 1 having a composition according to Formula 2:

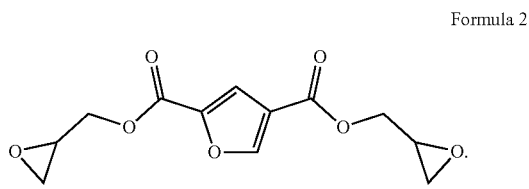 [SMILES: O=C(OCC1CO1)c1coc(C(=O)OCC2CO2)c1]

Formula 2

3. The diglycidyl ether of claim 1 having a composition according to Formula 3:

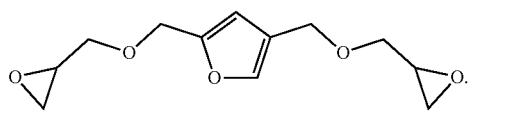

Formula 3

4. The diglycidyl ester of claim 1 having a composition according to Formula 4:

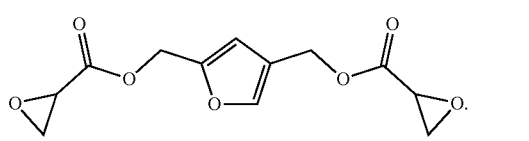

Formula 4

5. A method of making a diglycidyl ester of claim 1, the method comprising:
reacting 2,4-FDCA with an allyl halide to form an ester having a composition according to Formula 2a:

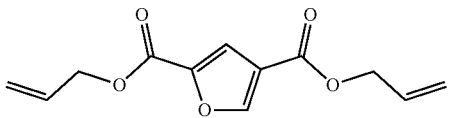

Formula 2a and;
epoxidizing the ester to form the diglycidyl ester having a composition according to Formula 2:

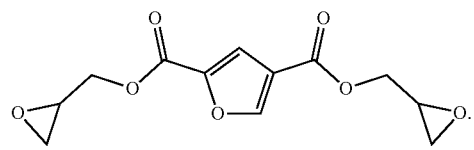

Formula 2

6. The method according to claim 5, wherein the allyl halide is an allyl bromide or an allyl chloride.

7. The method according to claim 5, wherein the step of epoxidizing the ester is mediated by one or more of performic acid, peracetic acid, meta-chloroperoxybenzoic acid, or an enzyme.

8. The method according to claim 5, wherein the ester of Formula 2 is present in an oligomeric form.

9. A method of making a diglycidyl ester of claim 1, the method comprising:
reacting 2,4-FDCA with epichlorodrine to form a diglycidyl ester having a composition according to Formula 2:

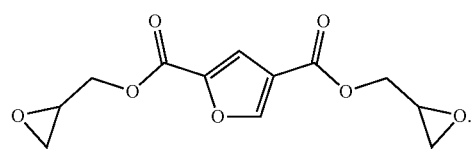

Formula 2

10. A method of making a diglycidyl ether of claim 1, the method comprising:
reacting 2,4-FDME with epichlorodrine to form a diglycidyl ether having a composition according to Formula 3:

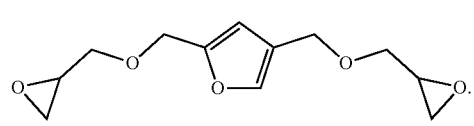

Formula 3

11. A method of making a diglycidyl ester of claim 1, the method comprising:
reacting 2,4-FDME with acrylic acid to form an ester having a composition according to Formula 4a:

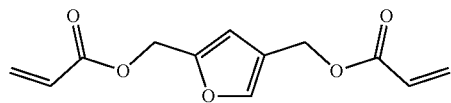
Formula 4a
and;
epoxidizing the ester to form the diglycidyl ester having a composition according to Formula 4:
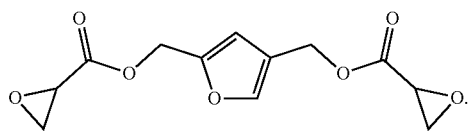
Formula 4
12. The method according to claim 11, wherein the step of epoxidizing the ester is mediated by one or more of performic acid, peracetic acid, meta-chloroperoxybenzoic acid, or an enzyme.
* * * * *